(12) United States Patent
Moser

(10) Patent No.: US 8,386,292 B2
(45) Date of Patent: Feb. 26, 2013

(54) SYSTEM AND METHOD FOR TRIGGERING A PROCESS ON AN ENTERPRISE SYSTEM

(75) Inventor: Martin K. Moser, Speyer (DE)

(73) Assignee: SAP AG, Walldorf (DE)

( * ) Notice: Subject to any disclaimer, the term of this patent is extended or adjusted under 35 U.S.C. 154(b) by 1185 days.

(21) Appl. No.: 11/318,436

(22) Filed: Dec. 28, 2005

(65) Prior Publication Data

US 2007/0162913 A1    Jul. 12, 2007

(51) Int. Cl.
*G06Q 10/00*    (2012.01)
(52) U.S. Cl. .................................................. 705/7.27
(58) Field of Classification Search ............ 705/7.27
See application file for complete search history.

(56) References Cited

U.S. PATENT DOCUMENTS

| | | | | |
|---|---|---|---|---|
| 5,184,179 A * | 2/1993 | Tarr et al. | | 399/8 |
| 5,640,002 A * | 6/1997 | Ruppert et al. | | 235/462.46 |
| 6,169,483 B1 * | 1/2001 | Ghaffari et al. | | 340/572.3 |
| 6,181,981 B1 * | 1/2001 | Varga et al. | | 700/236 |
| 6,351,621 B1 * | 2/2002 | Richards et al. | | 399/111 |
| 6,532,351 B2 * | 3/2003 | Richards et al. | | 399/111 |
| 6,584,309 B1 * | 6/2003 | Whigham | | 455/414.1 |
| 6,658,248 B1 * | 12/2003 | Lee | | 455/422.1 |
| 6,825,754 B1 * | 11/2004 | Rolin | | 340/10.34 |
| 7,127,236 B2 * | 10/2006 | Khan et al. | | 455/414.1 |
| 7,496,527 B2 * | 2/2009 | Silverstein et al. | | 705/26 |
| 7,769,619 B1 * | 8/2010 | Krysinski et al. | | 705/7.13 |
| 2001/0034566 A1 * | 10/2001 | Offer | | 700/236 |
| 2003/0055735 A1 * | 3/2003 | Cameron et al. | | 705/26 |
| 2003/0172028 A1 * | 9/2003 | Abell et al. | | 705/40 |
| 2005/0278270 A1 * | 12/2005 | Carr et al. | | 706/25 |
| 2006/0059005 A1 * | 3/2006 | Horn et al. | | 705/1 |

OTHER PUBLICATIONS

Putting it all together: an integrated look at SAP for EC&O. Builder, 28, 7, 92(1) May 2005.*

* cited by examiner

*Primary Examiner* — Johnna Loftis
(74) *Attorney, Agent, or Firm* — Kenyon & Kenyon LLP

(57) ABSTRACT

A system and method for triggering a process in an enterprise system. The present invention includes a computer-implemented method, in which an application triggers the execution of a process in response to an external signal indicating a status change. An alternate method includes executing a process in response to an external signal and providing a user interface to each user associated with the process so the user can manage the user's process data. Examples of implementations of the present invention include a credit card system, an RFID tag system, an electronic tollgate system, an automated callback system, and an inventory transport system.

23 Claims, 5 Drawing Sheets

SYSTEM AND METHOD FOR TRIGGERING A PROCESS ON AN ENTERPRISE SYSTEM

BACKGROUND

An enterprise system interacts with a variety of platforms, operating systems, protocols, and architecture both within the system itself and in external systems in communication with the enterprise system, in order to meet the computing needs of an enterprise or business. In performing many business tasks, a business process on the enterprise system must exchange data with other internal and external processes. This sometimes requires that the process wait for required data from elsewhere before executing. Since the data is dependent on execution of the other processes, it may arrive at the process at any time. After which, a user initiates the process.

This approach could be more efficient and productive so as not to slow down the process by awaiting initiation by the user. Moreover, because the user has to initiate this process, the user is not able to conduct other work. This becomes particularly problematic when the user is required to initiate processes that are routinely performed, such as on a given schedule, e.g., payroll distribution, or upon occurrence of a certain event, e.g., inventory purchasing, or that are executed concurrently.

Automating execution of the business processes would save the user time and effort because the user need not initiate the processes. And the processes could be executed immediately upon receipt of the required data. Hence, efficiency and productivity improve.

Accordingly, there is a need in the art for a system and method to trigger automatic execution of a process on an enterprise system.

DETAILED DESCRIPTION

Embodiments of the present invention include a system and a method in which execution of a process on an enterprise system is triggered by an external signal. The trigger advantageously allows the process to execute without user initiation, thereby freeing a user to perform other tasks.

In the enterprise system of an embodiment of the present invention, a platform may be used, e.g., SAP NetWeaver™, upon which configurable business processes may be created to control and use underlying applications to perform business tasks. The business processes are compatible with almost any components, using standard-based interoperability between the components. The underlying applications may be interchangeable and repeatable for different business processes and decoupled therefrom, such that the business processes are unaffected by changes in the underlying applications. Moreover, various components that interact with the business processes may be added or replaced without significant change to the processes themselves.

SAP NetWeaver™ provides tools for easily integrating data and applications from almost any source to form business processes. Through NetWeaver™, a user can create business processes made up of different applications and dataflow controls according to which the applications are integrated and executed. A business process may be executed to perform some business task. In embodiments of the present invention, one or more business processes may be automatically executed upon receipt of an external signal, multiple external signals, or a series of external signals. Multiple business processes may be executed in series, concurrently, or in any appropriate order.

The external signal may indicate a change in status of a device, a condition, an application, a user, or another system associated with the enterprise system. For example, the external signal may indicate that a user is now available to attend a meeting or a printer is now running low on toner. Associated with the external signal is a process to respond to the change in status. For example, the external signal may trigger a process to schedule a meeting in response to the user's availability or a process to order new toner in response to the printer's low toner.

Figure 1:
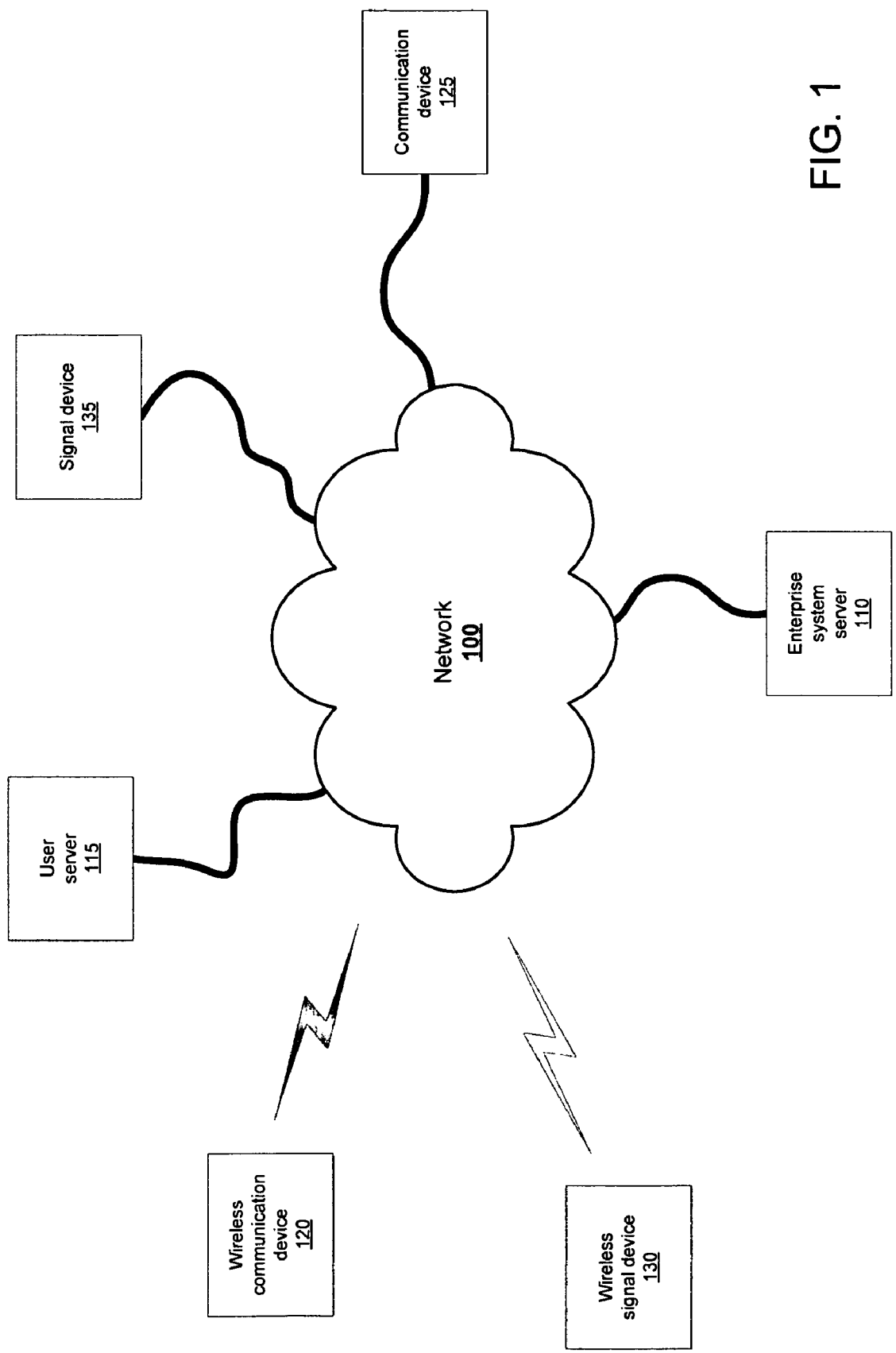
FIG. 1 is a system diagram of an embodiment of the present invention.

FIG. 1 shows a system diagram of an embodiment of the present invention. A network 100 may connect multiple devices, for example, an enterprise system server 110, a user server 115, a wireless communication device 120, a wired communication device 125, a wireless signal device 130, and a wired signal device 135. Server 110 may run on the business' enterprise system and include an integration platform, such as SAP NetWeaver™, business processes, and a trigger application. Server 115 may run as another server on the business' enterprise system, the customer's system, or the supplier's system. Server 110 may interact with server 115 during execution of business processes and display data to the business users and/or the customers and suppliers.

Signal devices 130 and 135 may send external signals to server 110 to indicate a status change, as described above. The signal device may be any device capable of transmitting a signal to network 100. Communication devices 120 and 125 may be used by the business users, customers, or suppliers to communicate with each other or to receive notification from server 110 of the status change or of execution of the corresponding business process. The communication device may be any device capable of sending and receiving any type of communication.

It is to be understood that the system of embodiments of the present invention is not limited to that shown, but may include any device or configuration capable of operating as described herein.

Figure 2:
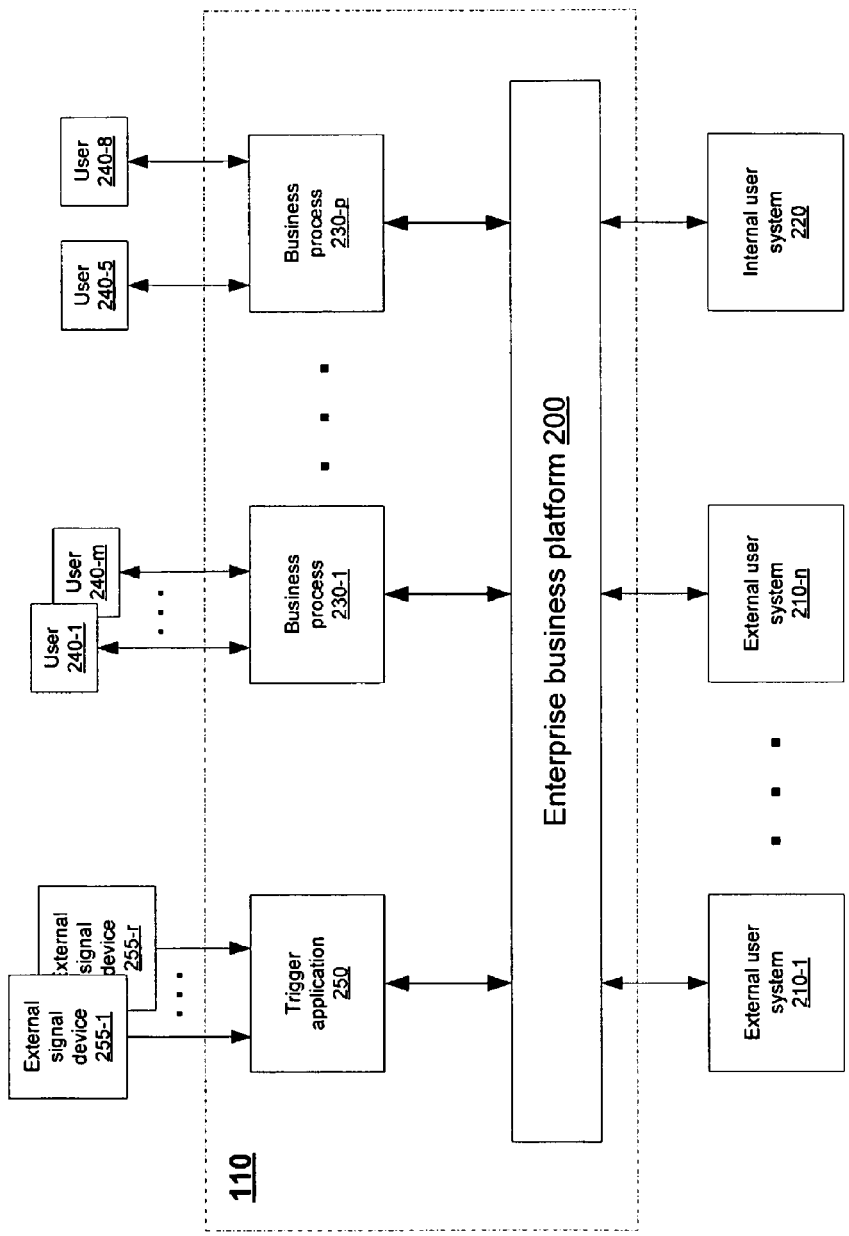
FIG. 2 is a block diagram that depicts an enterprise business architecture in accordance with an embodiment of the present invention.

FIG. 2 is a block diagram that depicts an enterprise business architecture in accordance with an embodiment of the present invention. An enterprise business architecture is one in which business tasks are modeled by business processes, which include applications for performing the business task and application controls. Enterprise system server 110 may include an enterprise process platform 200, business processes 230-1 through 230-p, and trigger application 250. Platform 200, such as NetWeaver™, may provide integration between trigger application 250 and business processes 230-1 through 230-p on server 110 and between external user systems 210-1 through 210-n and internal user system 220.

Business processes 230-1 through 230-p may perform business tasks, as described previously, when executed. One or more users 240 may interact with one or more business processes 230 according to the requirements of the users. For example, user 240-1 may interact with business process 230-1 in order to connect with user 240-m and vice versa. Similarly, users 240-5 and 240-8 may interact with business process 230-p to view data relevant to each user that is output by the process.

Trigger application 250 may cause the execution of business processes 230 upon receipt of an external signal from one or more of external signal devices 255-1 through 255-r. Trigger application 250 may identify the business process 230 corresponding to the received external signal and trigger execution of the identified business process 230 via platform 200.

Figure 3:
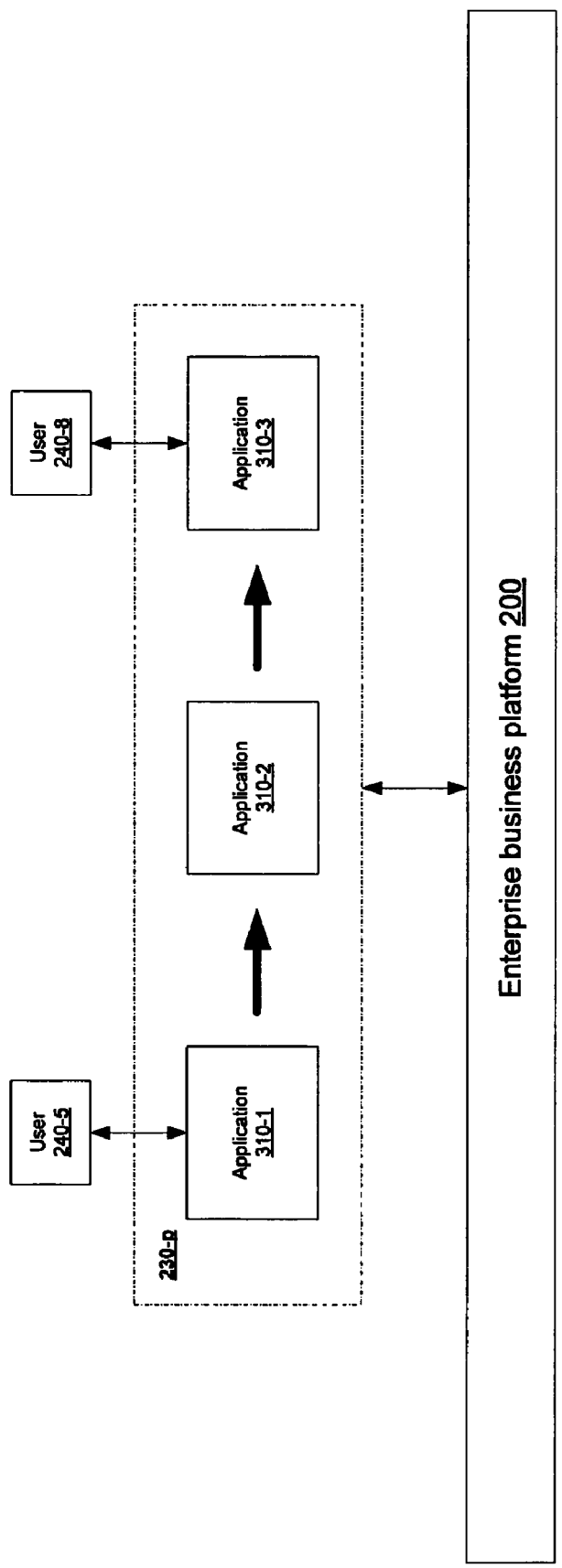
FIG. 3 is a block diagram that depicts a configurable business process architecture in accordance with an embodiment of the present invention.

FIG. 3 is a block diagram that depicts a configurable business process architecture in accordance with an embodiment of the present invention. A configurable business process architecture is one in which business processes may be configured using interchangeable and repeatable applications that perform business tasks. Business process 230-p may include applications 310-1 through 310-3, for example, from various sources and the dataflow control between the applications.

Each user 240-5 and 240-8 may interact with business process 230-p to provide the user-specific data and functionality the user requires from this business process. In this illustration, user 240-5 may interact with application 310-1 of business process 230-p to access data and any functions supported by application 310-1. User 240-8 may interact with application 310-3 of business process 230-p to access data which flows from application 310-1 to 310-3 and any functions supported by application 310-3. Business process 230-p may interact with other processes and other systems via enterprise business platform 200, such as NetWeaver™.

Figure 4:
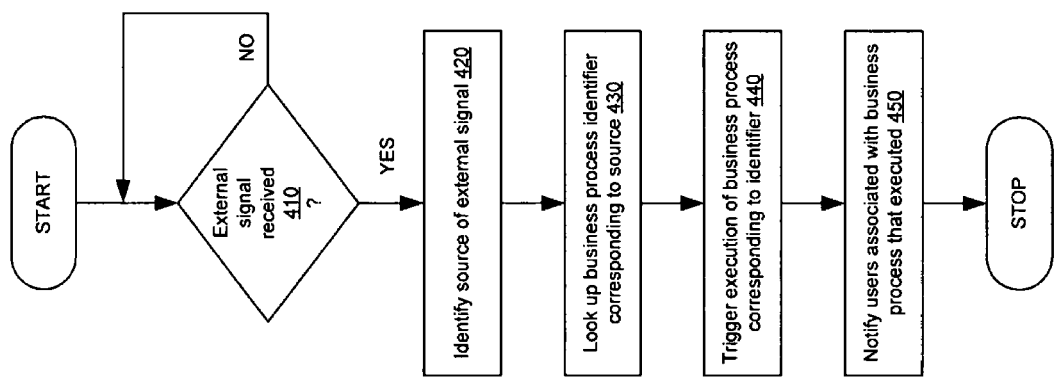
FIG. 4 is a flowchart of a method for triggering a process in an enterprise system in accordance an embodiment of the present invention.

FIG. 4 is a flowchart of a method for triggering a process on an enterprise system in accordance with an embodiment of the present invention. Server 110 may await (410) receipt of an external signal. Upon receipt of the signal, server 110 may identify (420) the source of the signal. Server 110 may then look up (430) in the database the identifier of the business process to be executed upon receipt of the external signal.

Server 110 may trigger (440) the execution of the business process according to its identifier. To trigger the execution, server 110 may call the business process associated with the identifier.

Server 110 may notify (450) the users associated with the business process of execution of the process. Alternatively, server 110 may notify the users of the status change.

The following are examples of implementations of an embodiment of the present invention. The examples are for illustration purposes only and not intended to represent all implementations of embodiments of the present invention.

In a credit card billing implementation, server 110 may receive a signal from a credit card reader that a user's credit card had just been used in a purchase. The signal may include the user's name, the credit card account number, and the purchase amount. Server 110 may then trigger execution of a billing process, which charges the user's credit card account with the purchase amount. Server 110 may notify the user that the user's account has been charged. The billing process may allow the user to access the user's account and view the balance and the transaction history. The billing process may also provide functionality to the user to pay any amount of the user's balance from the user's bank account.

In a product reorder implementation, server 110 may receive a signal from an RFID receiver that a product with an RFID tag has just been scanned for purchase. The signal may include the product name, the product identifier, and the purchase location. Server 110 may then trigger execution of a reorder process, which decrements the product quantity by the amount purchased and determines whether it is time to reorder the product. Server 110 may notify the store manager when it is time to reorder the product. Alternatively, server 110 may place an order with the product supplier to ship the product to the store and then notify the store manager of the order and shipment. The reorder process may allow the store manager or the product supplier to view the product inventory in the store. The reorder process may also provide functionality to the store manager to reorder product.

In an automatic callback implementation, server 110 may receive an instant message from an instant messaging device that a person is now available to call back. The signal may include the name and telephone number of the callee and the name and telephone number of the caller. Server 110 may then trigger execution of a callback process, which connects the caller and the callee at the designated telephone numbers. The callback process may ring both the caller and the callee to indicate that the call has been placed and is ready for pickup by them.

In an inventory transport implementation, server 110 may receive a signal from an inventory scanner that inventory is ready to be moved. The signal may include the inventory number, its location, and its destination. Server 110 may then trigger a transport process, which determines the means of transport and maps out the route the inventory will take to its destination. Server 110 may notify the transporter to pick up the inventory and transport it to its destination. Server 110 may also notify the destination manager that the inventory is enroute. The transport process may allow the inventory manager to track the movement of the inventory.

In a tollgate billing implementation, server 110 may receive a signal from a tollgate reader that a user's electronic toll pass had just been read as the user passed through the tollgate. The signal may include the user's name, the toll pass number, and the toll amount. Server 110 may then trigger execution of a billing process, which deducts the toll amount from the user's prepaid account. Server 110 may notify the user that the toll has been deducted from the user's account. The billing process may allow the user to access the user's account and view the balance and the transaction history. The billing process may also provide functionality to the user to add value to the user's account from the user's bank account.

Figure 5:
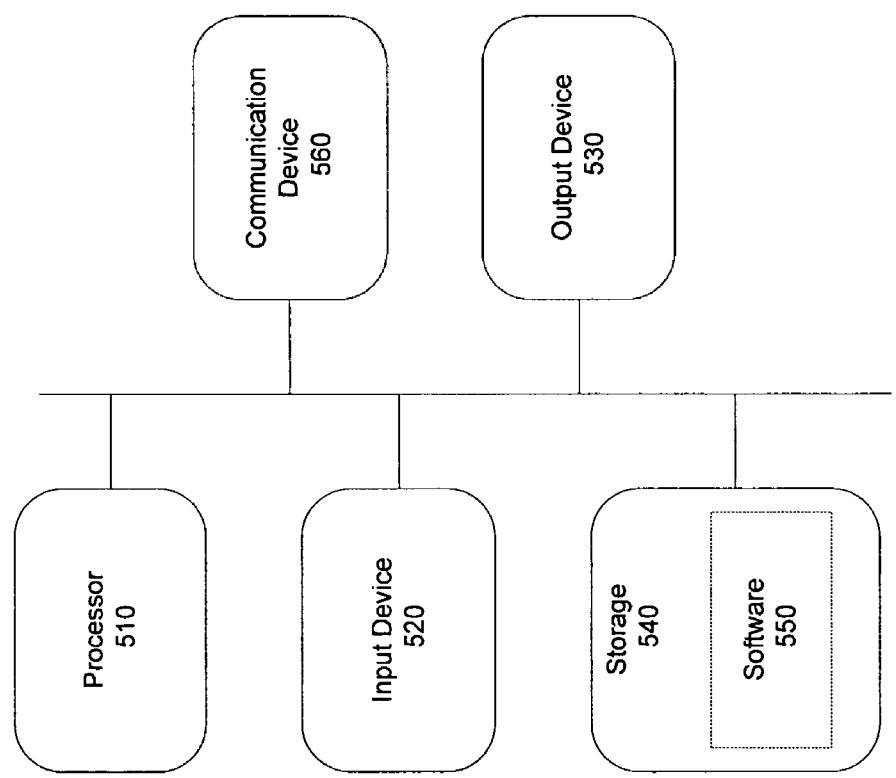
FIG. 5 is a block diagram that depicts a computing device in accordance with an embodiment of the present invention.

FIG. 5 illustrates the components of a basic computing device in accordance with an embodiment of the present invention, e.g., enterprise system server 110. The computing device may be a personal computer, workstation, handheld personal digital assistant ("PDA"), or any other type of microprocessor-based device. The computing device may include one or more of processor 510, input device 520, output device 530, storage 540, and communication device 560.

Input device 520 may include a keyboard, mouse, pen-operated touch screen or monitor, voice-recognition device, or any other device that provides input. Output device 530 may include a monitor, printer, disk drive, speakers, or any other device that provides output.

Storage 540 may include volatile and nonvolatile data storage, including one or more electrical, magnetic or optical memories such as a RAM, cache, hard drive, CD-ROM drive, tape drive or removable storage disk. Communication device 560 may include a modem, network interface card, or any other device capable of transmitting and receiving signals over a network. The components of the computing device may be connected via an electrical bus or wirelessly.

Software 550, which may be stored in storage 540 and executed by processor 510, may include, for example, the application programming that embodies the functionality of the present invention. Software 550 may include a combination of enterprise applications.

Network 100 may include any type of interconnected communication system, which may implement any communications protocol, which may be secured by any security protocol. The corresponding network links may include telephone lines, DSL, cable networks, T1 or T3 lines, wireless network connections, or any other arrangement that implements the transmission and reception of network signals.

The computing device may implement any operating system, such as Windows or UNIX. Software 550 may be written in any programming language, such as ABAP, C, C++, lava or Visual Basic. In various embodiments, application software embodying the functionality of the present invention may be deployed on a standalone machine, in a client/server arrangement or through a Web browser as a Web-based application or Web service, for example.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A computer-implemented method for managing business processes in an enterprise system, comprising:
   in response to at least one external signal indicating a status change, identifying a source of the external signal;
   searching a database of stalled business processes to match an identifier of the source with a stalled business process;
   if a match is detected, automatically executing with the processor the stalled process using data associated with the status change;
   notifying a user associated with the executed business process through a communications device that the process has been executed; and
   executing additional stalled business processes concurrently with the stalled business process, wherein the stalled business process and the additional stalled business processes remain static when underlying applications of the enterprise system are interchanged.

2. The method of claim 1, further comprising:
   notifying at least one user associated with the external signal of the status change through the communications device.

3. The method of claim 1, wherein the executing comprises:
   providing interaction between users associated with the external signal.

4. The method of claim 1, further comprising:
   receiving the external signal from a device.

5. The method of claim 1, wherein the status change is a change in a device, a condition, an application, a user, or a system.

6. The method of claim 5, further comprising:
   executing a process associated with the device, the condition, the application, the user, or the system.

7. The method of claim 1, wherein the process represents a business task.

8. A system comprising:
   a server running on an enterprise system and housing an integration platform;
   an external signal source;
   a processor in communication with the source, the processor configured to:
   identify a source of an external signal;
   search a database of stalled business processes to match an identifier of the source with a stalled business process;
   if a match is detected, automatically trigger execution of the stalled process in response to the external signal from the source, the process associated with the identifier;
   executing additional stalled business processes concurrently with the stalled business process;
   at least one application housed on a storage medium, the at least one application run by the server and being executed by the processor to trigger execution of the process, wherein the stalled business process and the additional stalled business processes remain static when the at least one application is interchanged with another application; and
   a communication device in communication with the processor to notify at least one user regarding the process execution.

9. The system of claim 8, wherein the external signal source is a credit card reader, an RFID receiver, an instant messaging device, an electronic tollgate receiver, or an inventory scanner.

10. The system of claim 8, wherein the processor is to trigger execution of an account updating process, a purchasing process, a callback process, a billing process, or a routing process.

11. The system of claim 8, wherein the communication device is a telephone, a personal digital assistant, a computer, or a pager.

12. The system of claim 8, wherein the communication device is connected to the processor through a network.

13. The system of claim 8, wherein the external signal source is a wired signal device.

14. The system of claim 8, wherein the external signal source is a wireless signal device.

15. The system of claim 8, wherein the communications device is a wired communications device.

16. The system of claim 8, wherein the communications device is a wireless communications device.

17. The system of claim 8, wherein the at least one application executes a plurality of business processes upon receipt of the external signal.

18. The system of claim 8, wherein an additional server may be run on the enterprise system, the additional server interacting with the server during execution of the process.

19. The system of claim 18, wherein the additional server is a user server.

20. The system of claim 18, wherein the additional server provides data to customers or suppliers.

21. A method for managing user processes, comprising:
   in response to at least one external signal, identifying a source of the external signal;
   searching a database of stalled business processes to match an identifier of the source with a stalled business process;
   if a match is detected, automatically executing with the processor a stalled process comprising at least one application associated with the external signal, wherein the stalled process is associated with the identifier;
   notifying a user associated with the executed business process through a communications device that the process has been executed;
   providing a user interface through a computer medium to the user associated with the process to manage the user's process data; and executing additional stalled business processes concurrently with the stalled business process, wherein the stalled business process and the additional stalled business processes remain static when the at least one application is interchanged with another application.

22. The method of claim 21, wherein the process further comprises functionality to control data flow through the at least one application.

23. The method of claim 21, wherein the user interface for each user is tailored to the user's requirements of the executed process.

* * * * *